United States Patent [19]
Hongo

[11] Patent Number: 5,766,938
[45] Date of Patent: Jun. 16, 1998

[54] BIOLOGICAL DEODORIZING APPARATUS WITH ROTARY CARRIERS

[75] Inventor: Kenjiro Hongo, Tokyo, Japan

[73] Assignee: Sankyo Kogyo Co., Ltd., Tokyo, Japan

[21] Appl. No.: 856,634

[22] Filed: May 14, 1997

[30] Foreign Application Priority Data

May 15, 1996 [JP] Japan ................... 8-146692

[51] Int. Cl.⁶ ................................................. C12N 3/00
[52] U.S. Cl. ..................... 435/298.2; 435/299.1; 435/266; 422/5; 422/122; 422/180; 422/181
[58] Field of Search .................. 422/5, 122, 180, 422/181; 435/266, 298.2, 299.1

[56] References Cited

U.S. PATENT DOCUMENTS

| | | | |
|---|---|---|---|
| 4,999,302 | 3/1991 | Kahker et al. | 435/266 |
| 5,256,570 | 10/1993 | Clyde | 435/813 |
| 5,270,205 | 12/1993 | Rogalsky | 435/813 |
| 5,316,945 | 5/1994 | Minuth | 210/619 |
| 5,632,954 | 5/1997 | Coellner et al. | 422/4 |

*Primary Examiner*—David A. Redding
*Attorney, Agent, or Firm*—Lackenbach Siegel Marzullo Aronson & Greenspan, P.C.

[57] ABSTRACT

The present invention provides a biological deodorizing apparatus of large treating capacity and capable instantly of bringing into operation. The apparatus comprises a casing (1), a rotary shaft (2) and a carriers cartridge (3). The casing has an inlet (11) and an outlet (12) for a foul-smelling gas and a water supply port (13) and a water drain port (14), respectively, and has an opening (16) being closed with a cover (15). The rotary shaft (2) being of a horizontal type and its one end portion (21) being in said casing (1). The carriers cartridge (3) is of a type which a plurality of carrier discs (31) made of a high density polyethylene are inserted in a cylinder (32) having an inner diameter which fits with an outer diameter of each of said carrier discs (31) with each space (S) between every two carrier discs, which pressure rings (33, 34) are attached to the both ends of the cylinder (32), respectively, and which microorganisms are made to take root comprehensively inside and outside the carrier discs (31). Also the carriers cartridge (3) is capable of inserting into and taking out from the casing (1) through the opening (16) and is fixed coaxially to the rotary shaft (2), the lower portion of the carrier discs (31) being at lower than a water level (L) in the casing 1.

9 Claims, 3 Drawing Sheets

BIOLOGICAL DEODORIZING APPARATUS WITH ROTARY CARRIERS

BACKGROUND OF THE INVENTION

1. Field of the Invention

This invention relate to a biological deodorizing apparatus with rotary carriers.

2. Prior Art

A deodorizing apparatus utilizing microbes has become the object of public attention for low at running cost, though it is difficult to keep microbe in a regular living environment and various patterns of which have been developed.

The deodorizing apparatuses utilizing microbes heretofore in use have small capacity to deodorize gas as they are no more than that which microbes are made to live at the surface of each carrier what is called microbes are partially fixed to the carrier, and in order to treat a huge quantity of smelling gas it must be a large-scale.

Heretofore, further, because microorganisms have been made to take root after an apparatus was located on the place for treating, it has taken so long, three to six months to get it started.

An object of the present invention is to provide a biological deodorizing apparatus with rotary carriers which raises capacity of deodorizing gas by making microorganisms take root comprehensively inside and outside a carrier disc which contains a high ratio of tiny cavity and many small pores in all directions and is, as the result of this, capable of applying even a small device to various usage.

Another object of the present invention is to provide a biological deodorizing apparatus with rotary carriers which, by putting carriers together in a casing and by making microorganisms take root comprehensively thereto in a factory, can start immediately after it was carried to and settled at a place for treating.

A further object of the present invention is to provide a rotating mechanism for a casing.

A further object of the present invention is to keep microorganisms in a stable environment by supplying water to them.

SUMMARY OF THE INVENTION

A biological deodorizing apparatus with rotary carriers of the present invention comprises a casing, a rotary shaft and a carriers cartridge.

The casing has an inlet and an outlet for a foul-smelling gas and a water supply port and a water drain port, respectively, and also has an inserting into and taking out opening closable with a cover.

The rotary shaft is of a horizontal type and one end portion of which is in the casing.

The carriers cartridge is such that a plurality of carrier discs of a high density polyethylene are inserted with each space between every two discs in a cylinder which has an inner diameter fitting with an outer diameter of each carrier disc, pressure rings are attached that to both ends of the cylinder, respectively, and that microorganisms are made to take root to inside and outside the carrier discs.

Material of the carrier discs is same as of the carrier bead of the patent application Ser. No. 6(94)-174896 filed previously by the present assignee.

That the cartridge for carriers is inserted in the casing through the opening and fixed coaxially to the rotary shaft becomes such condition as the lower portions of the carrier discs can situate under the water level in the casing, and said inlet and said outlet for a foul-smelling gas is prevented their shortening by a partition wall between said casing and said carriers cartridge.

Preferably, said casing may have a plurality of supporting rollers at the lower inside on the cross section thereof and said carriers cartridge may ride on said supporting rollers at the periphery thereof.

Still preferably, said on one side of each of said carrier discs at least one water-scooping device may be provided.

Said water-scooping device may comprise at least one wing provided at right angles with in a radial direction on one side of said carrier disc and also at least one cup provided at a radial end of said wing on a front side in a rotating direction of said carrier disc.

Said water-scooping device may serve for a spacer too, which forms a space.

Said partition wall may be a ring plate provided to said carriers cartridge, and on the outer periphery of the ring plate a sealing material which slidably contacts with the inner surface of a wall of said casing may be provided.

Said ring plate may be arranged at the inflowing side of the foul-smelling gas of said casing.

Each of said carrier discs may have a plurality of holes in parallel with its axial line, and each of said holes may have diameters of an opening by a gas inlet shorter than diameters of an opening by a gas outlet.

Each of said carrier discs my include a plurality of beads in which microorganisms are made to take root comprehensively.

The foundation is laid on the place where a foul-smelling gas is treated, and a casing is settled on the foundation.

An inlet for a foul-smelling gas is connected to where a foul-smelling gas comes out and an outlet is opened to atmosphere. Also a supply port is connected to where to supply water and a drain port is opened, through a drain valve, to atmosphere at the same as the water level in the casing. To keep both levels equally is not only to keep microorganisms alive but also to wash the surfaces of and pores in the carrier discs, by supplying rotating carriers with water regularly. Washing is mostly depending on that materials are moved by the difference between consistencies of dirty water in the carrier side and cleansing water.

Bearings are settled on the foundation at the outside of a casing, and a horizontal type of a rotary shaft is mounted thereon. A part of the rotary shaft is inserted in the casing through the end disc thereof. If necessary, a sealing device to prevent gas from leaking is provided to the end disc.

A plurality of carrier discs made of a high density polyethylene are inserted in a cylinder having an inner diameter which fits with an outer diameter of each carrier disc with each space between every two carrier discs, and pressure rings are attached to the both ends of the cylinder, respectively. Thus, the carriers cartridge is constructed. In a factory microorganisms have been made to take root comprehensively inside and outside the carrier discs.

When use, the carriers cartridge is inserted in the casing and fixed to the rotary shaft, and which is connected to a power source, and pipes are necessarily arranged, before the carriers cartridge is carried to the place for treating.

Water is supplied through the supply port in the casing from a water supply side. Accordingly, the lower portion of each carrier disc in the carriers cartridge situates at lower than the water level in the casing and comes into soak regularly.

The carriers cartridge is rotated by rotating the rotary shaft and a foul-smelling gas is fed into the casing. A partition wall between the casing and the carriers cartridge prevents shortening the inlet and the outlet for a foul-smelling gas, so that the foul-smelling gas is made to go through inside the carriers cartridge. The foul-smelling gas enters the carriers cartridge through the pressure ring at one end thereof and foul-smelling ingredients in the foul-smelling gas become, every time the foul-smelling gas passes through each carrier disc, a prey of microorganism which are made to take root therein; and then the foul-smelling gas is deodorized and passes from the pressure ring at the other end, to a fixing plate in the form of grid, and then discharged into atmosphere from the outlet.

As the carrier discs are continuously rotated and regularly supplied with water, microorganisms act at their maximum of efficiency in a living environment under such a perfect maintenance.

In case of said casing having a plurality of supporting rollers at the lower inside on the cross section thereof and said carriers cartridge riding on said supporting rollers at the periphery thereof, as an excessive load does not act on the bearings, a long stable operation becomes capable.

In case of said on one side of each of said carrier discs at least one water-scooping device being provided as the water-scooping device scoops up water and supplies said carrier discs with it by rotating the carrier discs, living environment for microorganism is maintained satisfactory.

In case of said water-scooping device comprising at least one wing provided at right angles with in a radial direction on one side of said carrier disc and also at least one cup provided at a radial end of said wing on a front side in a rotating direction of said carrier disc, it is able not only to scoop up a fixed quantity of water by a cup but also to supply evenly the carrier discs with water as it flows along a wing to the center portion of the carrier disc.

In case of said water-scooping device serving for a spacer too, which forms a space, it is able not only to keep a space with certainty without inserting a spacer one by one but also to decrease the numbers of parts.

In case of said partition wall being a ring plate provided to said carriers cartridge, and on the outer periphery of the ring plate a sealing material which slidably contacts with the inner surface of a wall of said casing being provided, it is able not only to set a partition wall easily but also to deodorize completely with preventing leakage of gas.

In case of said ring plate being arranged at the flowing side of the foul-smelling gas of said casing, there is no space to hold a foul-smelling gas, and deodorization of the gas is nearly completed.

In case of each of said carrier discs having a plurality of holes in parallel with its axial line, and each of said holes having diameters of an opening by a gas inlet being shorter than diameters of an opening by a gas outlet, it is able to reduce loss of gas pressure.

In case of said each of said carrier discs including a plurality of beads, in which microorganisms are made to take root comprehensively, it is able to raise an effect of treating a foul-smelling gas, as a quantity of microorganisms to be made to take root is increased much more.

Now, the present invention will be described in greater detail by referring to the accompanying drawings that illustrate a preferred embodiment of the invention.

DETAILED DESCRIPTION OF THE PREFERRED EMBODIMENT

Figure 1:
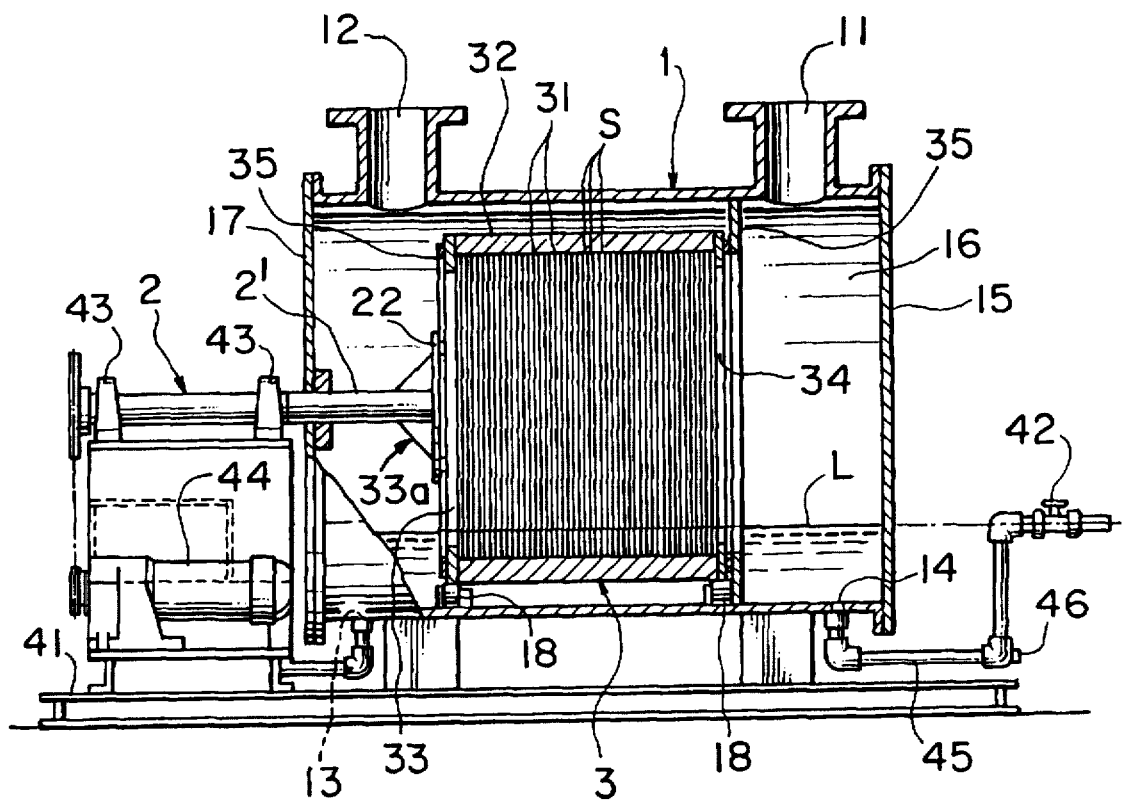
FIG. 1 is a partially cut off front view of an embodiment of a biological deodorizing apparatus with rotary carriers of the present invention.
Figure 2:
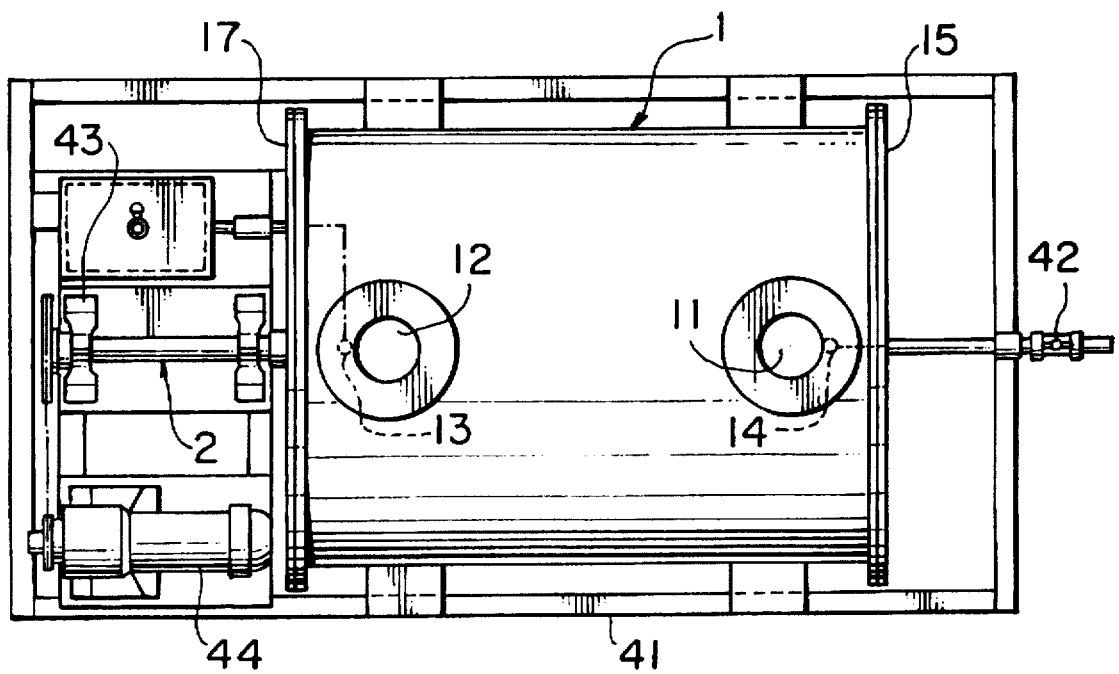
FIG. 2 is a plan view.
Figure 3:
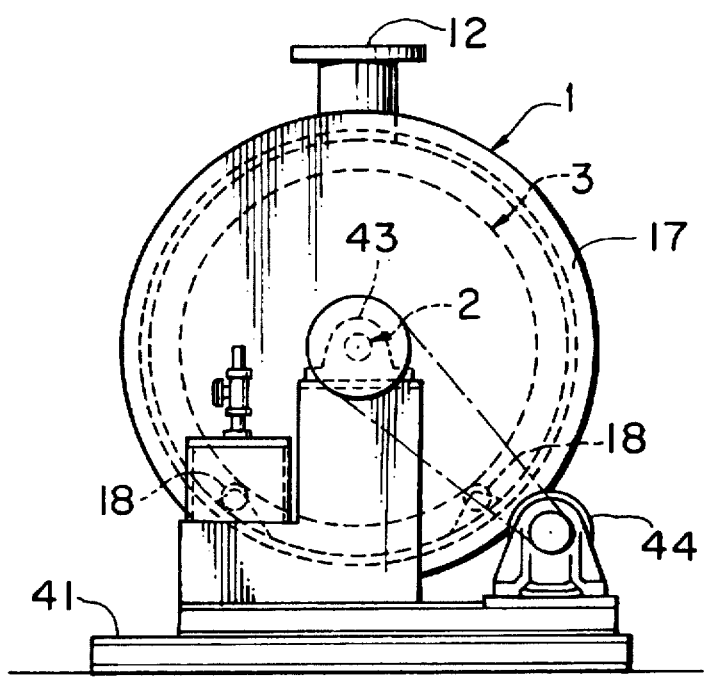
FIG. 3 is a left side view of FIG. 1.
Figure 4:
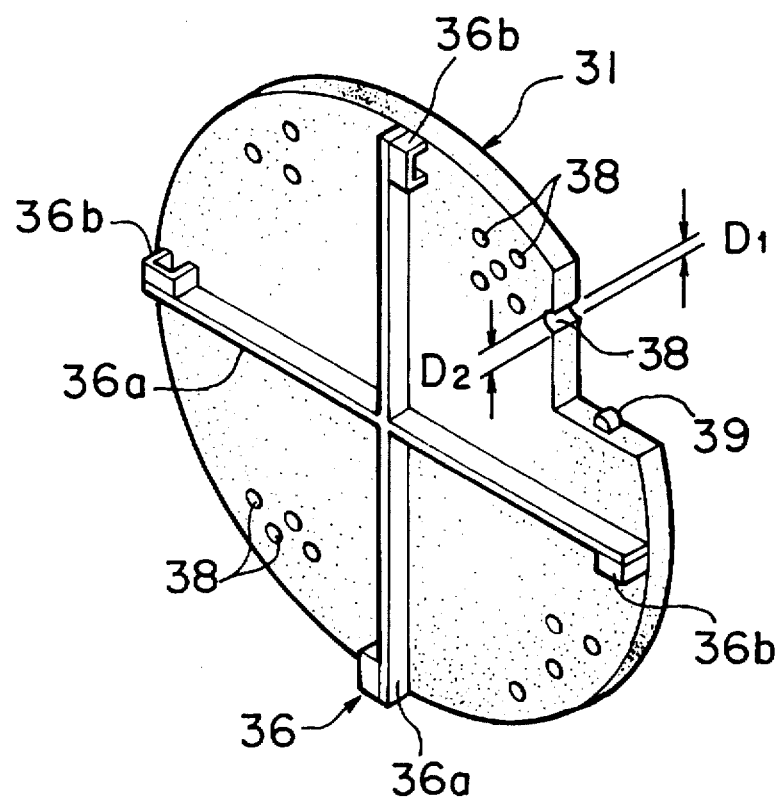
FIG. 4 is a partially cut off oblique section of a carrier disc.
Figure 5:
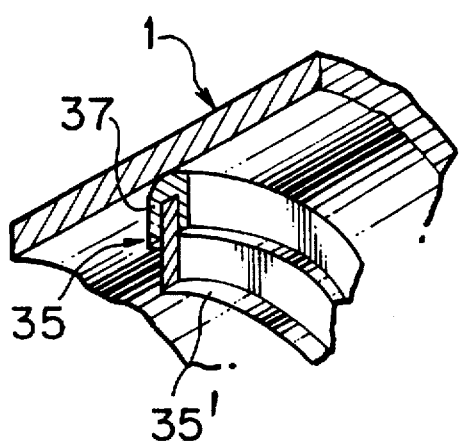
FIG. 5 is a partially cut off oblique section of an embodiment of a partition wall.

Referring to the accompanying drawings that illustrate a preferred embodiment of a biological deodorizing apparatus with rotary carriers according to the invention, it comprises a casing 1, a rotary shaft 2 and a carriers cartridge 3.

The casing 1 has an inlet 11 and an outlet 12 for a foul-smelling gas and a supply port 13 and a drain port 14 for water, which open in case of necessity, and the casing 1 has an opening 16 closable by a cover 15.

The rotary shaft 2 is of a horizontal type and one end of the shaft is inside the casing 1.

The carriers cartridge 3 is of a type which a plurality of carrier discs 31 made of a high density polyethylene are inserted in a cylinder 32 having an inner diameter which fits with an outer diameter of each of the carriers discs 31 with each space S between every two carrier discs, which pressure rings 33, 34 are attached to the both ends of the cylinder 32, respectively, and which microorganisms are made to take root.

The carriers cartridge 3 can be inserted into and taken out from the casing 1 through the opening 16 and is fixed coaxially to the rotary shaft 2 by fixing an affixed plate 33a in the form of grid to a fixing plate 22 on one end of the rotary shaft 2 with a bolt-nut.

Thus the lower portion of the carriers cartridge 3 situates at lower than water level L in the casing 1.

A partition wall 35 between the casing 1 and the carriers cartridge 3 prevents shortening the inlet 11 and the outlet 12 for a foul-smelling gas.

A foundation 41 is laid on the place where a foul-smelling gas is treated, and the casing 1 is settled on the foundation 41.

The inlet 11 for a foul-smelling gas is connected to where a foul-smelling gas comes out and the outlet 12 is opened to atmosphere. Also the supply port 13 is connected to where to supply water and the drain port 14 is opened, through a drain valve 42, to atmosphere at the same as the water level in the casing 1.

Bearings 43 are settled on the foundation 41. The rotary shaft 2 is carried by bearings 43 and one end 21 of the rotary shaft 2 is inserted in the casing 1 through an end wall 17 and fixed a fixing plate 22 at the end of it. A motor 44 is settled upon the foundation 41 and the rotary shaft 2 is connected to the motor 4.

At the bottom part of a drain passage 45 from the drain port 14 a cheese plug 46 is provided in order to drain a dead microorganism, separating from a foul-smelling gas, etc.

To use the cheese plug 46, it becomes difficult to open with mischief etc. so that the carrier discs are kept wet and it prevents microorganism from dying out.

Water goes to supply the casing 1 through the water supply port 11 from a water supply side and be drained through the drain port 14. Accordingly, the lower portion of each of the carrier discs 31 in the carriers cartridge 3 situates at lower than the water level L in the casing 1 and comes into soak regularly.

The carriers cartridge 3 is rotated by rotating the rotary shaft 2, which is rotated by the motor 44, and a foul-smelling gas is fed into the casing 1. The partition wall 35 between the casing 1 and the carriers cartridge 3 prevents shortening the inlet 11 and the outlet 12 for a foul-smelling gas, so that the foul-smelling gas is made to go through inside the carriers cartridge 3. The foul-smelling gas enter the carriers cartridge 3 through the pressure ring 34 at one end thereof and foul-smelling ingredients in the gas become, every time the foul-smelling gas passes through each carrier disc 31, a prey of microorganism which are made to take root therein; and then the foul-smelling gas is deodorized and passes through the pressure ring 34 at the other end and a fixed plate 33a in the form of grid, and then discharged into atmosphere from the outlet 12.

While the carrier discs 31 are continuously rotated, their outer circumferences go through water, so that the carrier discs 31 are supplied with water and cleaned regularly. Thus, microorganisms act at their maximum of efficiency in a living environment under such a perfect maintenance.

The casing 1 has a plurality of supporting rollers 18 at the lower inside on the cross section thereof and carriers cartridge 3 rides on the supporting rollers 18 at the periphery thereof so that the bearings 43 are not over loaded and they can long stably be operated.

On one side of each of the carrier discs 31 at least one water-scooping device 36 is provided. As the carrier discs 31 rotate, the water-scooping device 36 scoops up water and supplies the carrier discs 31 with it, and living environment for microorganism is maintained satisfactory.

The water-scooping device 36 comprises at least one wing 36a provided at right angles with in a radial direction on one side of the carrier disc 31 and also at least one cup 36b provided at a radial end of the wing 36a on a front side in a rotating direction of the carrier disc 31 so that it is able not only to scoop up a fixed quantity of water by the cup 36b but also to supply evenly the carrier discs 31 with water as it flows along the wing 36a to the center portion of the carrier disc 31.

The water-scooping device 36 serves for a spacer too, which forms a space so that it is able not only to keep a space S with certainty without inserting a spacer one by one but also to decrease the numbers of parts.

The partition wall 35 is a ring plate 35' provided to the carriers cartridge 3, and on the outer periphery of the ring plate a sealing material 37 which slidably contacts with the inner surface of a wall of the casing 1 is provided so that it is able not only to set the partition wall 35 easily but also to deodorize completely with preventing leakage of gas.

The ring plate 35' is arranged at the inflowing side of the foul-smelling gas of the cylinder 32, so that there is no space to hold a foul-smelling gas, and deodorization of the gas is nearly completed.

Each of the carrier discs 31 has a plurality of holes 38 in parallel with its axial line, each of the holes has diameters D1 of an opening by a gas inlet shorter than diameters D2 of an opening by a gas outlet so that it is able to reduce loss of gas pressure.

Each of the carrier discs 31 includes a plurality of beads 39, in which microorganisms are made to take root comprehensively, so that it is able to raise an effect of treating a foul-smelling gas, as a quantity of microorganisms to be made to take root is increased much more.

ADVANTAGE OF THE INVENTION

According to the present invention, as microorganisms are made to take root comprehensively to inside and outside a carrier disc, capacity to deodorize a foul-smelling gas becomes large, therefore, even a device in small size can be applied in various usages.

By making carriers a form of the cartridge, microorganisms can be made regularly to take root comprehensively inside and outside the carrier discs in a factory and a device can instantly be brought into operation only setting up and carrying it to the place.

Also, a carriers cartridge is inserted rotatably in the casing and a portion of each carrier disc passes during its rotation at lower than the water level in the casing; accordingly, the carrier discs are kept back from being dried, and living environment for microorganisms can be maintained perfectly, therefore they can function at their extremity and it can be free of maintenance.

According to claim 2, it is possible to let the device operate stably and for long without over-loading on the bearings.

According to claim 3, it is possible to maintain the living environment for microorganisms under such a fine condition because the rotation of the carrier disc has the water scooping up device to scoop up water and the carrier disc is supplied with water.

According to claim 4, it is possible to scoop up a fixed quantity of water by a cup and flow the water along a wing toward the center of the carrier disc and to supply evenly the carrier disc with the water.

According to claim 5, it is possible to keep a space with certainty without inserting a spacer one by one and to decrease the numbers of parts.

According to claim 6, it is possible to set a partition wall easily and to deodorize completely with preventing leakage of gas.

According to claim 7, it is possible to remove a space to hold a foul-smelling gas and nearly to complete its deodorization.

According to claim 8, it is possible to reduce loss of gas pressure.

According to claim 9, it is possible to increase more quantity of microorganisms to be made to take root and to raise an effect of treating a foul-smelling gas.

What is claimed is:

1. A biological deodorizing apparatus with rotary carriers comprising a casing, a rotary shaft and a carriers cartridge, said casing having an inlet and an outlet for a foul-smelling gas and a water supply port and a water drain port, respectively, and having an opening being closed with a cover, said rotary shaft being of a horizontal type and its one end portion being in said casing, said carriers cartridge being of a type which a plurality of carrier discs made of a high density polyethylene are inserted in a cylinder having an inner diameter which fits with an outer diameter of each of said carrier discs with each space between every two carrier discs, which pressure rings are attached to the both ends of the cylinder, respectively, and which microorganisms are made to take root comprehensively inside and outside the carrier discs, and also said carriers cartridge being capable of inserting into and taking out from said casing through said opening and being fixed coaxially to said rotary shaft, the lower portion of said carrier discs being at lower than a water level in said casing, said inlet and said outlet for a foul-smelling gas being prevented their shortening by a partition wall between said casing and said carriers cartridge.

2. A biological deodorizing apparatus with rotary carriers as claimed in claim 1 wherein said casing has a plurality of supporting rollers at the lower inside on the cross section thereof and said carriers cartridge rides on said supporting rollers at the periphery thereof.

3. A biological deodorizing apparatus with rotary carriers as claimed in claim 1 wherein on one side of each of said carrier discs at least one water-scooping device is provided.

4. A biological deodorizing apparatus with rotary carriers as claimed in claim 3 wherein said water-scooping device comprises at least one wing provided at right angles with in a radial direction on one side of said carrier disc and also at least one cup provided at a radial end of said wing on a front side in a rotating direction of said carrier disc.

5. A biological deodorizing apparatus with rotary carriers as claimed in claim 3 wherein said water-scooping device serves for a spacer too, which forms a space.

6. A biological deodorizing apparatus with rotary carriers as claimed in claim 1 wherein said partition wall is a ring plate provided to said carriers cartridge, and on the outer periphery of the ring plate a sealing material which slidably contacts with the inner surface of a wall of said casing is provided.

7. A biological deodorizing apparatus with rotary carriers in claim 6 wherein said ring plate is arranged at the inflowing side of the foul-smelling gas of said casing.

8. A biological deodorizing apparatus with rotary carriers as claimed in claim 1 wherein each of said carrier discs has a plurality of holes in parallel with its axial line, and each of said holes has diameters of an opening by a gas inlet shorter than diameters of an opening by a gas outlet.

9. A biological deodorizing apparatus with rotary carriers as claimed in claim 1 wherein each of said carrier discs includes a plurality of beads, in which microorganisms are made to take root comprehensively.

* * * * *